United States Patent [19]

Finnegan

[11] Patent Number: 4,479,603
[45] Date of Patent: Oct. 30, 1984

[54] REVERSE BUCKLING RUPTURE DISK ASSEMBLY METHOD

[75] Inventor: Michael C. Finnegan, Limerick, Ireland

[73] Assignee: BS&B Safety Systems, Inc., Tulsa, Okla.

[21] Appl. No.: 547,991

[22] Filed: Nov. 2, 1983

Related U.S. Application Data

[62] Division of Ser. No. 343,413, Jan. 28, 1982, Pat. No. 4,431,018.

[51] Int. Cl.³ ............................................. B23K 31/02
[52] U.S. Cl. .................................. 228/155; 228/182; 29/454
[58] Field of Search ................... 228/155, 182; 29/454

[56] References Cited

U.S. PATENT DOCUMENTS

| 3,467,120 | 9/1969 | Hill | 137/68 R |
| 3,685,686 | 8/1972 | Raidl | 220/89 A |
| 3,901,259 | 8/1975 | Banbury | 220/89 A X |

FOREIGN PATENT DOCUMENTS

| 10913 | 5/1980 | European Pat. Off. | 137/68 R |
| 1943291 | 3/1971 | Fed. Rep. of Germany | 137/68 R |

Primary Examiner—Kenneth J. Ramsey
Attorney, Agent, or Firm—C. Clark Dougherty, Jr.

[57] ABSTRACT

A reverse buckling rupture disk apparatus, adapted to be clamped between inlet and outlet companion bolted flanges, the operation of which is unaffected by the torque applied to the bolts of the companion flanges. The apparatus is comprised of a reverse buckling rupture disk which is welded at its periphery to an annular support ring. The annular support ring is in turn welded to an annular support member. Methods of manufacturing the apparatus are also provided.

6 Claims, 4 Drawing Figures

4,479,603

REVERSE BUCKLING RUPTURE DISK ASSEMBLY METHOD

CROSS-REFERENCE TO RELATED APPLICATION

This application is a division of U.S. patent application Ser. No. 343,413 filed Jan. 28, 1982 now U.S. Pat. No. 4,431,018.

BACKGROUND OF THE INVENTION

1. Field of the Invention

This invention relates generally to reverse buckling rupture disk apparatus, and more particularly, but not by way of limitation to improved reverse buckling rupture disk apparatus adapted to be clamped between companion bolted flanges and methods of manufacturing such apparatus.

2. Description of the Prior Art

Reverse buckling rupture disk apparatus have been developed and utilized heretofore. Such apparatus generally include a reverse buckling rupture disk having a concave-convex portion connected to an annular flange portion by a transition connection. In most of the prior apparatus, the annular flange portion of the rupture disk is clamped between inlet and outlet support members which are in turn adapted to be clamped between companion bolted flanges. Knife means for severing the rupture disk upon the reversal thereof are attached to the outlet support member or otherwise held in the apparatus. Various other arrangements have also been developed and used whereby one or both of the support members are omitted and/or other structure is substituted therefor.

In all of such prior apparatus wherein the annular flange portion of the reverse buckling rupture disk is clamped between companion bolted flanges with or without support members or other structure therebetween whereby the clamping pressure of the flanges is transmitted to the flange portion of the rupture disk, the operation of the rupture disk is adversely affected by changes or differences in the torque applied to the flange bolts. That is, changes or differences in the clamping pressure exerted on the rupture disk produce changes in stresses in the disk, particularly in the area of the transition connection, whereby the fluid pressure required to cause the disk to reverse and rupture is altered. Thus, when such a reverse buckling rupture disk apparatus is clamped between companion flanges, if too much or too little torque is applied to the flange bolts, the fluid pressure level at which the rupture disk fails can be changed appreciably from the predetermined design rupture fluid pressure level. This, in turn, can result in premature failure of the rupture disk or the existence of an overpressure condition in the vessel or system being protected without failure of the rupture disk.

In order to overcome or reduce changes in rupture pressure due to overtorquing or undertorquing the flange bolts, such reverse buckling rupture disk apparatus have been preassembled at the factory whereby the proper torque is applied to the rupture disk. In cases where the apparatus cannot be preassembled, precise instructions relating to the proper amount of torque to be applied to the flange bolts have been furnished to users of the apparatus. While these procedures have been effective to some extent, once a reverse buckling rupture disk apparatus has been installed, the disk cannot be removed for inspection purposes and reinstalled without inducing new stresses in the disk which alter its operational characteristics. Consequently, it has been the practice in the industry that once a reverse buckling rupture disk has been clamped between support members and/or flanges and removed, it is discarded and replaced.

By the present invention an improved reverse buckling rupture disk apparatus is provided which is adapted to be clamped between companion bolted flanges, the operation of which is unaffected by changes or differences in the torque applied to the flange bolts.

SUMMARY OF THE INVENTION

A reverse buckling rupture disk apparatus comprising a reverse buckling rupture disk having a concave-convex portion connected to an annular flange portion by a transition connection, an annular support ring positioned adjacent the annular flange portion of the rupture disk on the convex side thereof welded to the annular flange portion and an annular support member adapted to be clamped between companion bolted flanges positioned adjacent the concave side of the rupture disk and welded to the support ring. Methods of manufacturing the apparatus are also provided.

It is, therefore, a general object of the present invention to provide an improved reverse buckling rupture disk apparatus and methods of manufacturing the same.

A further object of the present invention is the provision of a reverse buckling rupture disk apparatus adapted to be clamped between companion bolted flanges, the operation of which is unaffected by the torque applied to the flange bolts.

Yet a further object of the present invention is the provision of methods of manufacturing a reverse buckling rupture disk apparatus adapted to be clamped between companion bolted flanges which is unaffected by the torque applied to the bolts of the flanges.

Another object of the present invention is the provision of reverse buckling rupture disk apparatus which can be installed between companion bolted flanges, removed, inspected, and reinstalled between such flanges without the operational characteristics of the apparatus being affected.

Other and further objects, features and advantages of the present invention will be readily apparent to those skilled in the art upon a reading of the description of preferred embodiments which follows when taken in conjunction with the accompanying drawings.

DESCRIPTION OF PREFERRED EMBODIMENTS

Figure 1:
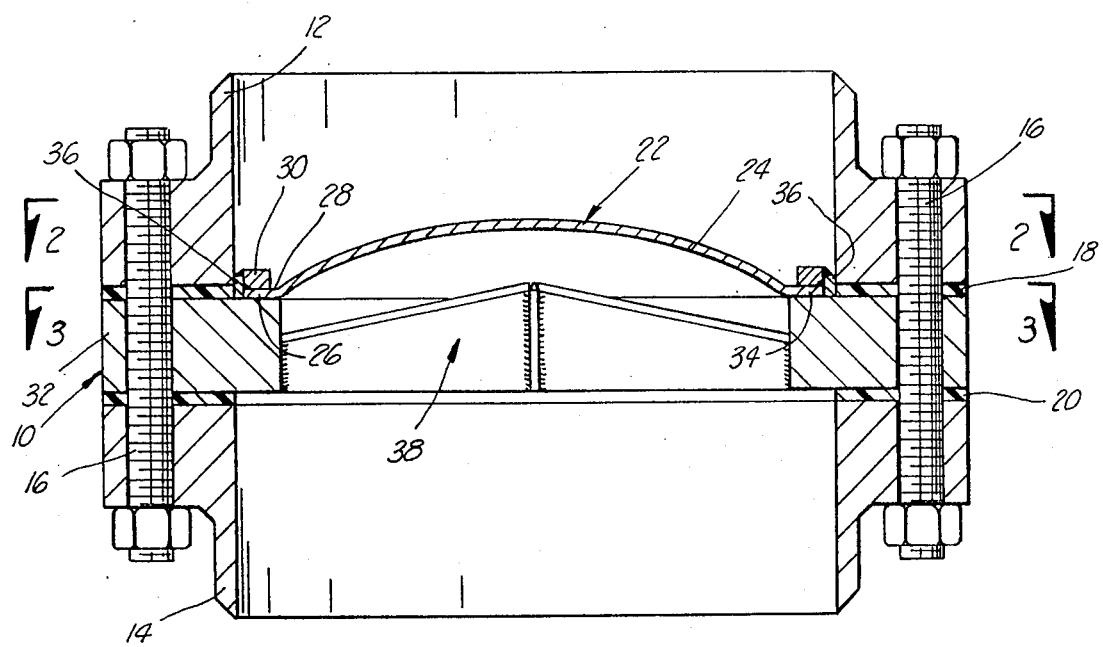
FIG. 1 is a cross-sectional view of the apparatus of the present invention clamped between companion bolted flanges.
Figure 2:
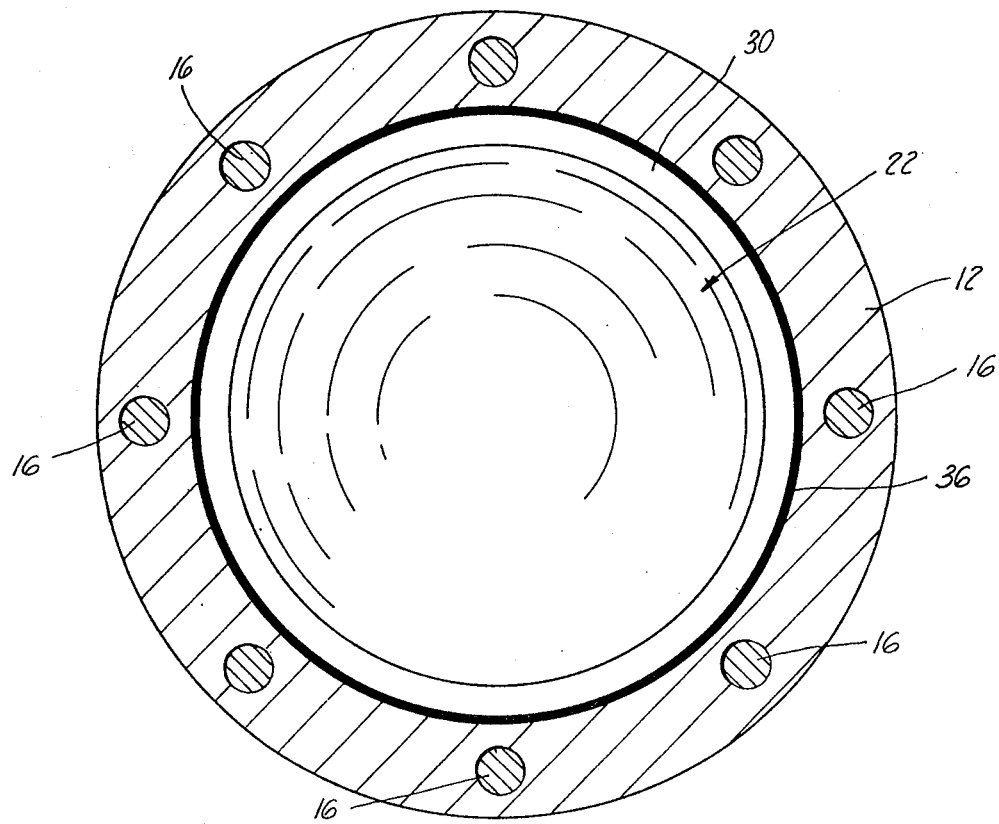
FIG. 2 is a cross-sectional view taken along line 2—2 of FIG. 1.
Figure 3:
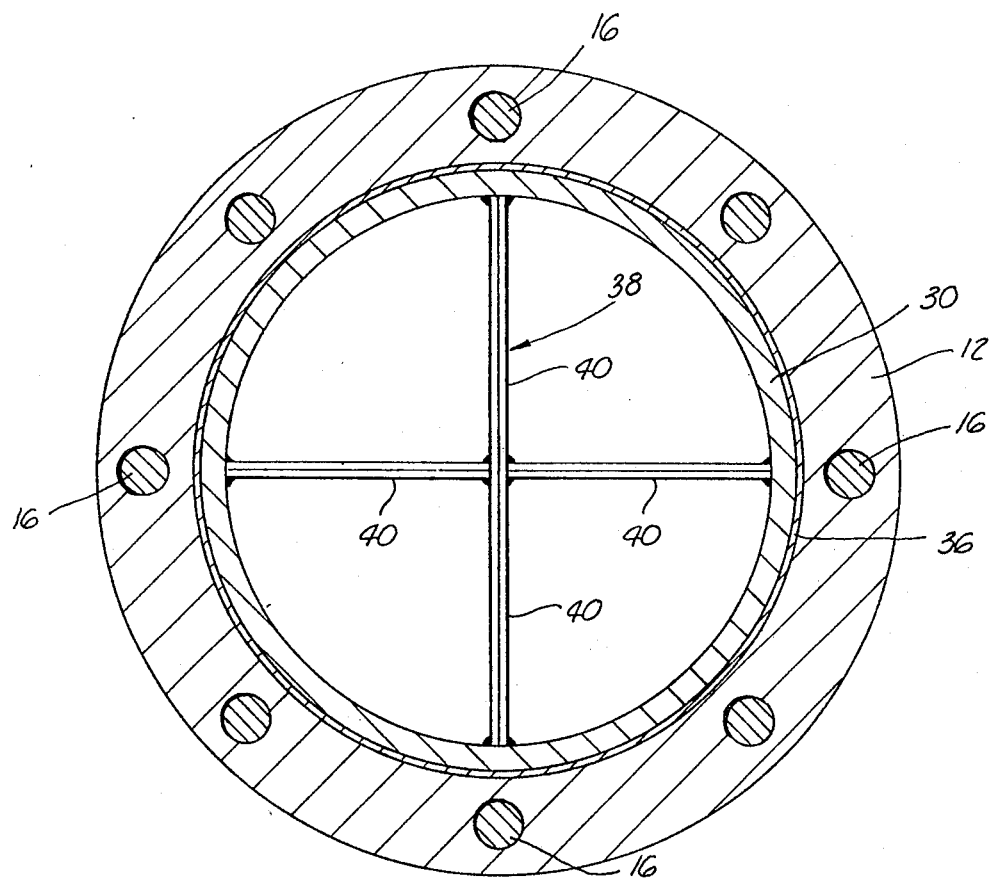
FIG. 3 is a cross-sectional view taken along line 3—3 of FIG. 1.

Referring now to the drawings and particularly to FIGS. 1–3, the apparatus of the present invention, generally designated by the numeral 10, is illustrated clamped between inlet and outlet companion bolted flanges 12 and 14, respectively. The apparatus 10 and the flanges 12 and 14 are clamped together by means of the usual plurality of bolts or studs an dnuts 16. A pair of gaskets 18 and 20 are disposed between the apparatus 10 and the flanges 12 and 14 for providing sealing engagement therebetween.

The apparatus 10 is comprised of a reverse buckling rupture disk 22 having a concave-convex portion 24 connected to an annular flange portion 26 by a transition connection 28. An annular support ring 30 having a width corresponding to the width of the annular flange portion 26 of the rupture disk 22 and an outer diameter equal to the outer diameter of the rupture disk 22 is positioned adjacent the annular flange portion 26 on the convex side of the rupture disk 22. As will be described in further detail herein, the rupture disk 22 is welded to the support ring 30 at the periphery of the rupture disk 22. A support member 32 is provided which is adapted to be clamped between the inlet flange 12 and outlet flange 14. That is, the support member 32 has an outer diameter substantially equal to the outer diameter of the flanges 12 and 14 and includes openings around the periphery thereof for passage of the bolts or studs and nuts 16 therethrough. As will be understood, seating surfaces are provided on opposite sides of the support member 32 for engaging the seating surfaces of the companion flanges 12 and 14 and the gaskets 18 and 20 positioned between the flanges and the support member. The internal diameter of the annular support member 32 is smaller than the internal diameters of the flanges 12 and 14 so that a portion of the annular support member 32 extends inwardly within the flanges 12 and 14. The inwardly extending portion of the support member 32 provides an annular surface 34 within the interior of the flanges 12 and 14. Projecting from the surface 34 of the support member 32 and extending longitudinally into the interior of the flange 12 is an annulet 36. The annulet 36 is preferably integrally formed as a part of the support member 32.

The rupture disk 22 and support ring 30 welded thereto have substantially equal outside diameters which are slightly less than the inside diameter of the annulet 36. The rupture disk 22 and support ring 30 are positioned adjacent the surface 34 of the support member 32 interiorly of the annulet 36 and the support ring 30 is welded to the annulet 36.

As shown in the drawings, knife means generally designated by the numeral 38 can optionally be welded to or otherwise attached within the support member 32 whereby the knife means 38 are positioned so that the concave-convex portion 24 of the rupture disk 22 is severed by the knife means 38 upon reversal. In a preferred form, the knife means 38 includes four sharpened blade legs 40 positioned at right angles to each other with the internal ends connected together and the external ends welded to the interior of the support member 32. In this configuration, when the concave-convex portion 24 of the rupture disk 22 reverses itself and contacts the knife blade means 38, the concave-convex portion 24 is severed into four petals. However, as is well understood, other configurations of blade legs and other forms of knife means can be utilized in the apparatus 10 and rather than being attached to the support member 32 the knife blade means can be independently clamped within and/or between the flanges 12 and 14.

Figure 4:
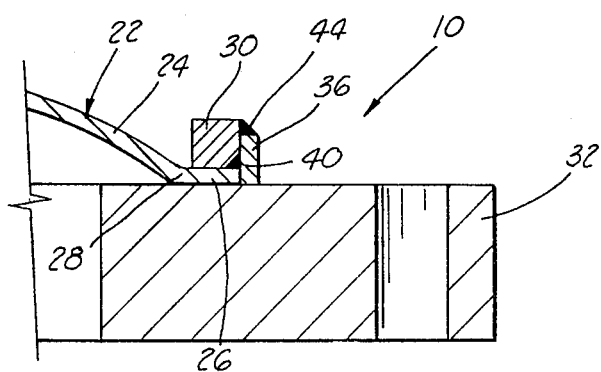
FIG. 4 is an enlarged cross-sectional view of a portion of the apparatus of the present invention.

Referring now specifically to FIG. 4, an enlarged portion of the apparatus 10 is illustrated. As shown in FIG. 4, the annular flange portion 26 of the rupture disk 24 is preferably welded to the annular support ring 30 at the periphery of the annular flange portion 26 by a continuous weld 42. The weld 42 is preferably formed using a low heat welding technique whereby a minimum of stresses are set up in the annular flange portion 26 of the rupture disk 22, and particularly, so that no stresses are formed in the area of the transition connection 28. As is well understood, in the failure of a reverse buckling rupture disk, the reversal of the disk begins at the transition connection, and therefore, as long as stresses are not produced in the rupture disk at the transition connection area thereof during the welding process, the fluid pressure level at which the reversal process takes place is unaffected. As is also shown in FIG. 4, the support ring 30 is preferably welded to the annulet 36 of the support member 32 at the top outside portion of the support ring 30 so that heat and stresses from the welding operation are not transmitted to the rupture disk 22. Preferably, the support ring 30 is continuously welded to the annulet 36 of the support member 32 by a continuous weld 44.

A preferred technique for forming the welds 42 and 44 in the apparatus 10 is a technique known as electron beam welding. Electron beam welding produces low heat and minimum stresses in the welded parts and consequently can be achieved without setting up stresses in the rupture disk 22 which affect the operation thereof. However, any low heat welding technique can be utilized.

In manufacturing the apparatus 10, the rupture disk 22 can be preformed whereby it includes the concave-convex portion 24 connected to the annular flange portion 26 by the transition connection 28 prior to welding it to the support ring 30 and prior to welding the support ring 30 to the annulet 36 of the support member 32. Preferably, however, the rupture disk 22, in a flat state prior to having the concave-convex portion 24 formed therein, is welded to the support ring 30 followed by the welding of the support ring 30 to the annulet 36 of the support member 32. After the completion of the welding, fluid under pressure such as compressed air is caused to flow by way of the internal portion of the support member 32 into contact with the flat rupture disk 22. The air pressure is increased to a level whereby the concave-convex portion 24 is formed at a desired crown height, etc. This latter manufacturing technique whereby the concave-convex portion 24 is formed in the rupture disk 22 after welding insures that any stresses which may have been formed in the rupture disk 22 by the welding process are relieved.

In operation of the apparatus 10 when clamped between companion inlet and outlet bolted flanges as illustrated in FIG. 1, pressurized fluid from the vessel or system being protected (to which the inlet flange 12 is sealingly connected) is exerted on the convex side of the concave-convex portion 24 of the rupture disk 22. When the fluid pressure level within the vessel or system and exerted on the rupture disk 22 reaches or exceeds the predetermined design rupture pressure of the rupture disk 22, the rupture disk 22 reverses itself and is severed by the knife means 38 whereby the pressurized fluid is relieved through the apparatus 10 into the outlet flange 14. The outlet flange 14 is normally connected to a conduit which leads the relieved fluid to the atmosphere or to another system or vessel for containing such fluids.

Because the rupture disk 22 is welded to the support member 32 and is not clamped between the support member 32 and the inlet flange 12, the operation of the rupture disk 22 is independent and unaffected by the clamping pressure exerted on the flanges 12 and 14 and the support member 32. This in turn allows the apparatus 10 to be installed between companion bolted flanges and the flange bolts to be torqued indiscriminately without affecting the operation of the apparatus 10. In addition, the apparatus 10 can be removed and inspected and then reinstalled many times without affecting its operation.

In order to facilitate a clear understanding of the methods and apparatus of the present invention, the following example is given.

EXAMPLE

A steel annular support ring having an external diameter of 31.5 inches, an internal diameter of 30 inches and a thickness of 0.5 inches is welded to a 0.050 inch thick flat metal disk having a diameter of 31.3 inches. The weld is a continuous weld located at the periphery of the disk and is accomplished using a conventional low heat electron beam welding apparatus. The disk with support ring welded thereto is positioned on an annular support member within the area defined by an integral annulet formed thereon. The support member has an external diameter of 37.8 inches, an internal diameter of 30 inches and a thickness of 1.4 inches. The support member includes 40 equally spaced 1.2 inch bolt holes on a bolt circle diameter of 35.6 inches and the integral annulet is 1.38 inches high, 4 inches thick and has an internal diameter of 29.5 inches. The support ring is welded to the annulet of the support member by a continuous weld located at the top of the annulet using a conventional low heat electron beam welding apparatus.

After the welding operations are completed, compressed air at a pressure level of 435 psig is applied to the disk by way of the internal portion of the support member whereby the central portion of the disk is formed into a concave-convex shape having a crown height (distance from the base to the highest point of the concave-convex portion) of 6.9 inches. A knife means having four blade legs welded together at right angles is welded onto the support member.

The resulting reverse buckling rupture disk apparatus has a deisgn rupture pressure (fluid pressure level at which reversal occurs) of 68.6 psig+3% and can be clamped between conventional 30 inch, 150 psig ASA bolted flanges without being affected by the torque applied to the flange bolts.

The conventional low heat electron beam apparatus is comprised of a Vickers 10 KV Welder including an electron beam gun and focusing lens, a 3.25'×3.25'×4.92' vacuum chamber including a rotary table and fixturing and a control panel for set welding the parameters of the various welds.

The welding of the disk to support ring is accomplished by locating the disk and support ring, in special fixturing which is mounted on the rotary table. The rotary table is then placed on tracks which guide it into the vacuum chamber. When the rotary table is in close proximity to the electron gun, the chamber is evacuated down to $10^{-3}$ torr. Accurate positioning of the disk and support ring under the electron gun is achieved by horizontal movement of the rotary table in mutually perpendicular directions while being viewed under the application of a very low powered Electron Beam Weld. This technique ensures that the beam tracks the disk to support ring joint along the entire circumference. Once optimum positioning has been achieved several Electron Beam tacks are applied. With the beam tracking the circular joint accurately, the main weld is performed in one continuous run and a slight overlap is permitted at the end of the run to ensure the integrity of the joint.

The welding parameters for the disk-support ring weld are as follows:
1. Accelerating Voltage—125 KV+5 KV.
2. Electron Beam Current—13 mA+1 mA.
3. Distance between workpiece and gun—292 mm+3 mm.
4. Welding travel speed—23+2 mm/sec. (With beam spin to obtain suitable spot shape).
5. Welding vacuum (minimum)—$10^{-3}$ Torr with beam
6. Focusing Current—879 mA+5 mA.
7. Penetration—The weld penetration needs to be of the order of 0.080"-120" for consistent results.

The welding of the support ring with disk welded thereto to the support member is accomplished in the same manner as described above with the exception that the assembly is positioned in the chamber at 20° to horizontal due to the geometric constraints of the vacuum chamber.

The welding parameters for the support ring to support member are as follows:
1. Accelerating Voltage—140 KV+5 KV
2. Electron Beam Current—25 mA+2 mA
3. Distance between workpiece and gun—276 mm+4 mm.
4. Welding travel speed—23.28 mm per second. (With beam spin to obtain suitable spot shape).
5. Welding Vacuum—$10^{-3}$ Torr with beam.
6. Focusing current—929 mA+5 mA.
7. Penetration—In order to provide rigidity the penetration of the second weld needs to lie between 0.2 in. and 0.24 in.

In welding the support ring to the support member, if the gap between the support ring and the integral annulet of the support member exceed 0.3 mm, a slight depression in the head of the weld will occur. A cosmetic weld is therefore permitted, which entails using a low power beam to remelt the surface of the weld and give it a more uniform finish.

The welding parameters for the cosmetic weld are as follows:
1. Accelerating Voltage—110 KV+5 KV.
2. Electron beam current—10 mA+1 mA.
3. Distance between workpiece and gun—276 mm+4 mm.
4. Welding travel speed—23.28 mm/sec.
5. Welding Vacuum—$10^{-3}$ Torr.
6. Focusing current—788 mA+5 mmA.

Thus, the present invention is well adapted to carry out the objects and attain the ends and advantages mentioned as well as those inherent therein. While the particular arrangement of parts, location of welds and configuration of the apparatus 10 shown in the drawings and described above is preferred, numerous changes can be made in such arrangement of parts and construction details which will suggest themselves to those skilled in the art and which are included within the spirit of this invention as defined by the appended claims.

What is claimed is:

1. A method of manufacturing a reverse buckling rupture disk apparatus adapted to be clamped between inlet and outlet companion bolted flanges, the operation of said apparatus being unaffected by the torque applied to the bolts of the companion flanges comprising the steps of:

welding a reverse buckling rupture disk having a concave-convex portion and an annular flange portion to an annular support ring positioned adjacent the annular flange portion of said rupture disk on the convex side thereof, said welding being carried out at the periphery of said annular flange portion of said rupture disk using a low heat welding technique; and welding said support ring having said rupture disk welded thereto to an annular support member adapted to be clamped between said companion bolted flanges, said support member being positioned adjacent the annular flange portion of said rupture disk on the opposite side thereof from said support ring.

2. The method of claim 1 wherein said support member includes an integral annulet positioned exteriorly of said support ring and said rupture disk and positioned to extend longitudinally into the interior of the inlet flange of said companion bolted flanges, and wherein said support ring is welded to said annulet.

3. The method of claim 2 which is further characterized to include the step of attaching knife means to said support member positioned to sever the concave-convex portion of said rupture disk upon the reversal thereof.

4. A method of manufacturing a reverse buckling rupture disk apparatus adapted to be clamped between inlet and outlet companion bolted flanges, the operation of said apparatus being unaffected by the torque applied to the bolts of the companion flanges, comprising the steps of:

welding a flat sheet disk to an annular support ring at the periphery of said disk using a low heat welding technique;

welding said support ring having said disk welded thereto to an annular support member adapted to be clamped between said companion bolted flanges using a low heat welding technique, said support member being positioned adjacent said flat disk on the opposite side thereof from said support ring; and applying fluid pressure to said flat disk by way of the interior of said support member whereby the central portion of said disk is bulged into a concave-convex shape.

5. The method of claim 4 wherein said support member includes an integral annulet positioned exteriorly of said support ring and disk and positioned to extend longitudinally into the interior of the inlet flange of said companion bolted flanges and wherein said support ring is welded to said annulet.

6. The method of claim 5 which is further characterized to include attaching knife means to said support member positioned to sever the concave-convex portion of said rupture disk upon the reversal thereof.

* * * * *